(12) United States Patent
Zhang

(10) Patent No.: US 10,459,079 B2
(45) Date of Patent: Oct. 29, 2019

(54) METHOD FOR TRANSMITTING A QUANTIZED VALUE IN A COMMUNICATION SYSTEM

(71) Applicants: Wenfeng Zhang, Plano, TX (US); ZTE Corporation, Shenzhen, Guangdong (CN)

(72) Inventor: Wenfeng Zhang, Plano, TX (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/767,136

(22) PCT Filed: Oct. 10, 2016

(86) PCT No.: PCT/US2016/056295
§ 371 (c)(1),
(2) Date: Apr. 9, 2018

(87) PCT Pub. No.: WO2017/062958
PCT Pub. Date: Apr. 13, 2017

(65) Prior Publication Data
US 2019/0072662 A1 Mar. 7, 2019

Related U.S. Application Data

(60) Provisional application No. 62/239,697, filed on Oct. 9, 2015.

(51) Int. Cl.
*H04W 64/00* (2009.01)
*G01S 13/87* (2006.01)
*G01S 5/00* (2006.01)
*G01S 5/10* (2006.01)
*G01S 5/02* (2010.01)
*H04L 1/00* (2006.01)

(52) U.S. Cl.
CPC .............. *G01S 13/878* (2013.01); *G01S 5/00* (2013.01); *G01S 5/0036* (2013.01); *G01S 5/0294* (2013.01); *G01S 5/10* (2013.01); *H04L 1/0078* (2013.01)

(58) Field of Classification Search
CPC .... H04W 64/00; H04W 64/006; G01S 13/878
See application file for complete search history.

(56) References Cited

U.S. PATENT DOCUMENTS

2005/0255865 A1* 11/2005 Sillasto .................... H04Q 7/20
2007/0160138 A1   7/2007 Wedi et al.
2010/0007543 A1   1/2010 Mueck
2012/0040691 A1   2/2012 Han et al.
(Continued)

OTHER PUBLICATIONS

International Search Report and Written Opinion dated Jan. 20, 2017 for International Application No. PCT/US2016/056295, filed on Oct. 10, 2016 (9 pages).

*Primary Examiner* — Myron Wyche
(74) *Attorney, Agent, or Firm* — Perkins Coie LLP

(57) ABSTRACT

The presented invention claims new method for transmission of a quantization value by segmenting the quantization range into a number of number of contiguous value ranges, and using a quantization with scaling in each of value range, to reduce the quantization error, wherein the quantization is applied to those timing measurements when they are transmitted from the mobile station to the network server.

19 Claims, 2 Drawing Sheets

Flow chart for transmission of quantized value

(56) References Cited

U.S. PATENT DOCUMENTS

2014/0099970 A1  4/2014 Siomina et al.
2014/0254580 A1  9/2014 Shim et al.
2017/0289947 A1* 10/2017 Zaidi .................... H04W 64/00

\* cited by examiner

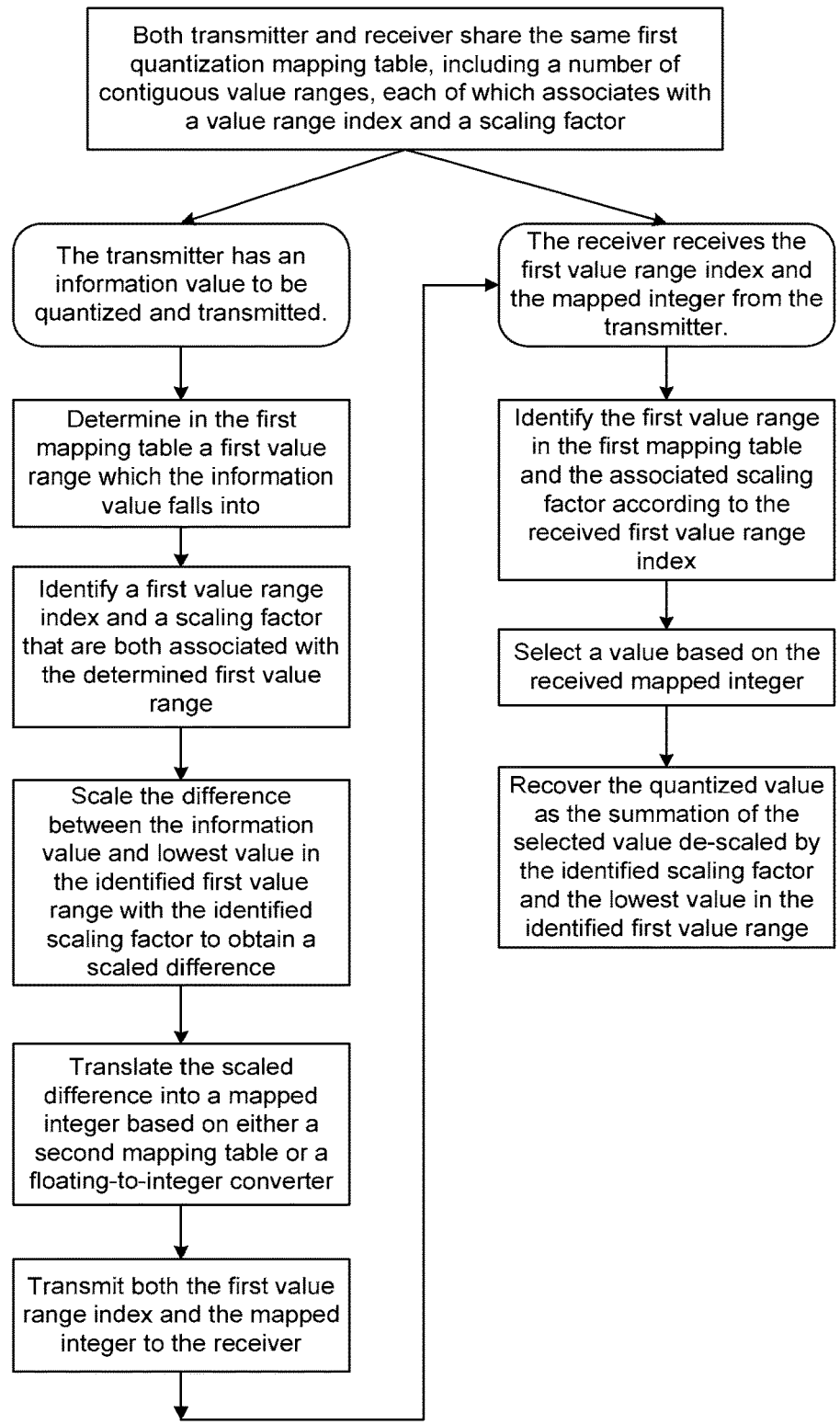
Figure 1 Flow chart for transmission of quantized value

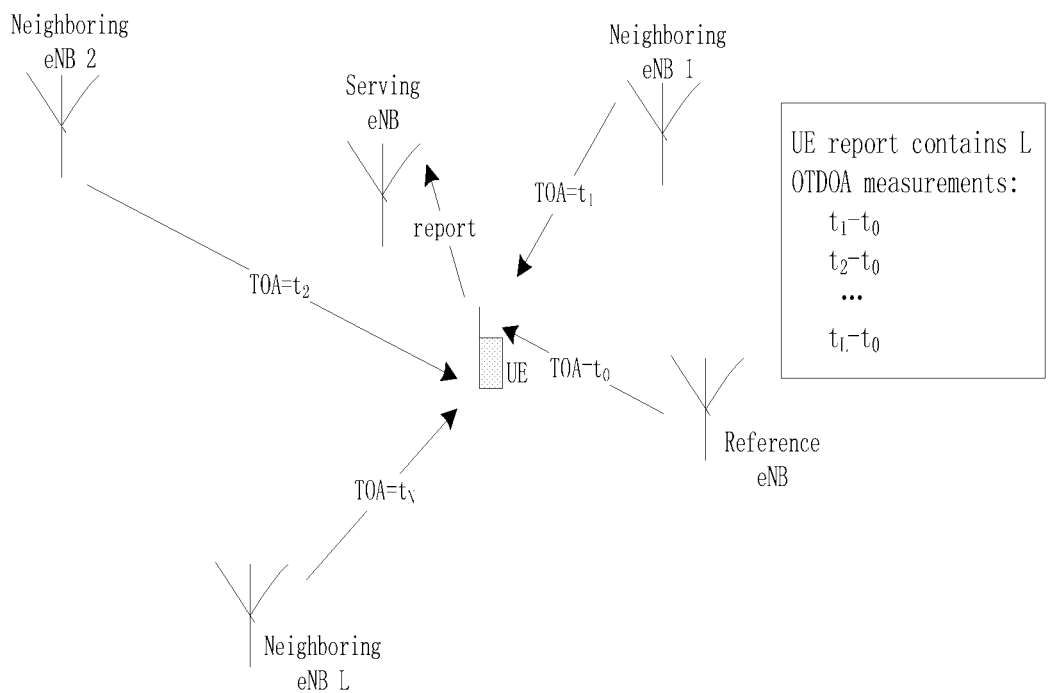
Figure 2 RSTD measurements and reporting

METHOD FOR TRANSMITTING A QUANTIZED VALUE IN A COMMUNICATION SYSTEM

FIELDS OF THE APPLICATION

The presented invention claims new method to transmit the quantized information value in wireless or wired communication, with reduced effective quantization error. The invention has a specific application but not limited to the mobile positioning in 3GPP Long Term Evolution (LTE) system that is one of the candidates for the 4-th generation wireless system.

BACKGROUND

In a communication system, an information value is often sent from one communication node (transmitter) to another communication node (receiver), via either a wired or a wireless channel. Due to the limited word length in a data packet where the information value is put in for the transmission, the information value is often quantized to a limited number of digits, or equivalently translated to a value range index that represents the value range which the information value falls into. For example, a general mapping table of N rows for such translation upon information value x is shown in Table 1. The information value to be quantized is assumed to be between $a_0$ (inclusively) and $a_N$ (non-inclusively). The whole quantization range is denoted as $[a_0, a_N)$. This quantization range is segmented into N contiguous value ranges by (N−1) values $a_i$ for $1 \le i \le N-1$, where $a_i$ for all $0 \le i \le N$ are known to both transmitter and receiver, and meanwhile satisfies $a_0 < a_1 < a_2 < \ldots < a_{N-1} < a_N$. Then if the value x falls into the value range $[a_m, a_{m+1})$ for some m satisfying $0 \le m \le N-1$, the corresponding value range index m is used to represent the quantized value x and is sent from the transmitter to the receiver.

TABLE 1

General mapping table for quantization and transmission

| Value range index | Value range where x falls into |
| --- | --- |
| 0 | $a_0 \le x < a_1$ |
| 1 | $a_1 \le x < a_2$ |
| . | . |
| . | . |
| . | . |
| i | $a_i \le x < a_{i+1}$ |
| . | . |
| . | . |
| . | . |
| N − 1 | $a_{N-1} \le x < a_N$ |

On the receiver side that receives the value range index m, the receiver knows the value being quantized is within value range of $[a_m, a_{m+1})$, it can pick any value $\bar{x}$, which satisfies $a_m \le \bar{x} \le a_{m+1}$, as the recovery for the value x. The absolute difference $|\bar{x}-x|$ is the quantization error.

In order to reduce the quantization error $|\bar{x}-x|$, a prior-art quantization method using scaling factor was proposed. Its principle is described as following: denote the quantization procedure as $\bar{x}=Q(x)$, where function $Q(\bullet)$ represents the quantization procedure mentioned above, including the translation from value x to a value range index and the recovery from value range index to the quantized value $\bar{x}$. Assume the maximum quantization error with respect to quantization function $Q(\bullet)$, i.e., the quantization resolution of $Q(\bullet)$, is R, then with a positive scaling factor k, $|k \cdot x - Q(k \cdot x)| < R$ holds, which further leads to $$\left| x - \frac{Q(k \cdot x)}{k} \right| < \frac{R}{k}.$$

This is to say, the quantization resolution or the maximum quantization error can be reduced to be the original divided by k if the scaling factor k is used to scale the value x before the quantization on the transmitter side, and is used to de-scale (i.e., the operation performed at the receiver that is opposite to the scaling operation performed at the transmitter) the quantized value that is received by the receiver on the receiver side. However, the drawback of this solution is that the effective quantization range is also reduced to be the original divided by k, i.e., if the quantization function $Q(\bullet)$ allows the input to be within range $[a_0, a_N)$, the quantization with scaling factor k only allows the value x to be within range of $$\left[ \frac{a_0}{k}, \frac{a_N}{k} \right).$$

SUMMARY

In order to reduce the quantization error while avoiding the quantization range being reduced, a new method is proposed in this application. In this new method, the quantization with scaling is not done over the whole range of $[a_0, a_N)$. Instead, it is performed upon a small value range of $[a_i, a_{i+1})$ for i satisfying $0 \le i \le N-1$. In addition, the scaling factor that is applied in one value range can be different from the scaling factor that is applied in a different value range. The quantization function $Q(\bullet)$ that is applied in each value range can be based on a new quantization mapping table, or a floating-to-integer converter.

The present invention has an application in mobile positioning in wireless communication, in which the location of a mobile station can be derived from the timing measurements that are measured by the mobile station and reported by the mobile station to the network server that calculates the location of the mobile station. The quantization is applied to those timing measurements when they are transmitted from the mobile station to the network server.

Even though the claimed method is designed for timing measurement reports in mobile positioning, the same principle can be used in any wireless or wired messaging containing quantization quantities for other purposes.

These and other implementations and examples of this design in software and hardware are described in greater details in the attached drawings, the detailed description and the claims.

BRIEF DESCRIPTION OF THE DRAWINGS

FIG. 1 shows a flow chart for the transmission of a quantized value.

FIG. 2 shows the example of RSTD measurements and reporting involving with base stations (eNBs) and a mobile station (UE).

DETAILED DESCRIPTION

According to the claimed method for quantization of an information value x, when the value x falls into a first value range $[a_m, a_{m+1})$ of a first quantization mapping table with a first value range index m that satisfies $0 \le m \le N-1$, the quantization function $Q(\cdot)$ with scaling is applied upon value of $x-a_m$, i.e., the recovered quantization value $\bar{x}$ is derived as $$\bar{x} = a_m + \frac{1}{k_m} Q(k_m \cdot (x - a_m)),$$

where the scaling factor $k_m$ is associated with the value range of $[a_m, a_{m+1})$ in the first quantization mapping table, which includes the information as shown in Table 2, and can be different from the scaling factors applied in other value ranges in the first quantization mapping table. Because the scaling is not performed upon the entire quantization range $[a_0, a_N)$ of the first quantization mapping table, the entire quantization range $[a_0, a_N)$ is not reduced. Meanwhile, the quantization resolution or maximum quantization error in the first value range $[a_m, a_{m+1})$ is reduced to be the original divided by $k_m$.

TABLE 2

The first mapping table associated with value range index and scaling factor

| Value range index | Value range where x falls into | scaling factor |
|---|---|---|
| 0 | $a_0 \le x < a_1$ | $k_0$ |
| 1 | $a_1 \le x < a_2$ | $k_1$ |
| . | . | . |
| . | . | . |
| . | . | . |
| i | $a_i \le x < a_{i+1}$ | $k_i$ |
| . | . | . |
| . | . | . |
| . | . | . |
| N − 1 | $a_{N-1} \le x < a_N$ | $k_{N-1}$ |

In one embodiment of this application, the quantization function $Q(k_m \cdot (x-a_m))$ can be implemented based on a second mapping table as shown in Table 3, where the quantization range of the second mapping table is segmented into M contiguous value ranges $[b_j, b_{j+1})$ for all j satisfying $0 \le j \le M-1$. This second mapping table translates the value of $k_m \cdot (x-a_m)$ into a second value range index.

TABLE 3

The second mapping table

| Second value range index | Second value range |
|---|---|
| 0 | $[b_0, b_1)$ |
| 1 | $[b_1, b_2)$ |
| . | . |
| . | . |
| . | . |
| j | $[b_j, b_{j+1})$ |
| . | . |
| . | . |
| . | . |
| M − 1 | $[b_{M-1}, b_M)$ |

Then in order to transmit an information value x,
On the transmitter side, the transmitter decides a first value range $[a_m, a_{m+1})$ in the first quantization mapping table, for which $a_m \le x < a_{m+1}$ is satisfied, and identifies a first value range index m and a scaling factor $k_m$ that are both associated with the decided first value range $[a_m, a_{m+1})$. Next, the transmitter decides a second value range $[b_{m'}, b_{m'+1})$ in the second quantization mapping table, for which $b_{m'} \le k_m \cdot (x-a_m) < b_{m'+1}$ is satisfied, and identifies a second value range index m' that is associated with the decided second value range. Lastly, the transmitter transmits both the first value range index m and the second value range index m' to the receiver.

On the receiver side, upon receiving both the first value range index m and the second value range index m', the receiver identifies the first value range $[a_m, a_{m+1})$ in the first mapping table and the associated scaling factor $k_m$ according to the received first value range index m, and identifies the second value range $[b_{m'}, b_{m'+1})$ in the second mapping table according to the received second value range index m'. Next, the receiver recovers the quantized value $\bar{x}$ as $$\bar{x} = a_m + \frac{y}{k_m},$$

where y is any value satisfying $b_{m'} \le y < b_{m'+1}$.

In another embodiment of this application, the quantization function $Q(k_m \cdot (x-a_m))$ can also be implemented based on a floating-to-integer converter that converts a floating number to an integer number by using a floor function $\lfloor z \rfloor$, which equals to the largest integer that is smaller than or equal to z. To be more specific, in order to the transmit an information value x,
On the transmitter side, the transmitter decides a first value range $[a_m, a_{m+1})$ in the first quantization mapping table, for which $a_m \le a_{m+1}$ is satisfied, and identifies a first value range index m and a scaling factor $k_m$ that are both associated with the decided first value range $[a_m, a_{m+1})$ in the first quantization mapping table. Next, the transmitter calculates the converted integer (g) by either $g = \lfloor k_m \cdot (x-a_m) \rfloor$ or $g = \lfloor k_m \cdot (x-a_m) + 0.5 \rfloor$. Lastly, the transmitter transmits both the first value range index m and the converted integer g to the receiver.
On the receiver side, upon receiving both the first value range index m and the converted integer g, the receiver identifies the first value range $[a_m, a_{m+1})$ in the first mapping table and the associated scaling factor $k_m$ according to the received first value range index m. Next, the receiver recovers the quantized value $\bar{x}$ as either $$\bar{x} = a_m + \frac{g + 0.5}{k_m} \text{ or } \bar{x} = a_m + \frac{g}{k_m}.$$

Application to RSTD Quantization in OTDOA Positioning

In the 3GPP Long Term Evolution (LTE) standardization, the observed time difference of arrival (OTDOA) solution is specified to support mobile positioning. As shown in FIG. 2, the mobile station (also called user equipment, i.e. UE) in OTDOA measures and reports a number of time differences, each of which equals to the difference between the time of arrival (TOA) of downlink reference signal transmitted from each of a number of neighboring base stations (also called eNB) and the TOA of downlink reference signal transmitted from a reference base station. Such difference is also called reference signal time difference (RSTD). Each RSTD value is quantized at the mobile station side and the quantized RSTD is transmitted to the network positioning server via a specific signaling protocol.

TABLE 4

RSTD quantization mapping in LTE

| Reported Value | Measured Quantity Value | Unit |
|---|---|---|
| RSTD_0000 | $-15391 >$ RSTD | $T_s$ |
| RSTD_0001 | $-15391 \le$ RSTD $< -15386$ | $T_s$ |
| ... | ... | ... |
| RSTD_2258 | $-4106 \le$ RSTD $< -4101$ | $T_s$ |
| RSTD_2259 | $-4101 \le$ RSTD $< -4096$ | $T_s$ |
| RSTD_2260 | $-4096 \le$ RSTD $< -4095$ | $T_s$ |
| RSTD_2261 | $-4095 \le$ RSTD $< -4094$ | $T_s$ |
| ... | ... | ... |
| RSTD_6353 | $-3 \le$ RSTD $< -2$ | $T_s$ |
| RSTD_6354 | $-2 \le$ RSTD $< -1$ | $T_s$ |
| RSTD_6355 | $-1 \le$ RSTD $\le 0$ | $T_s$ |
| RSTD_6356 | $0 <$ RSTD $\le 1$ | $T_s$ |
| RSTD_6357 | $1 <$ RSTD $\le 2$ | $T_s$ |
| RSTD_6358 | $2 <$ RSTD $\le 3$ | $T_s$ |
| ... | ... | ... |
| RSTD_10450 | $4094 <$ RSTD $\le 4095$ | $T_s$ |
| RSTD_10451 | $4095 <$ RSTD $\le 4096$ | $T_s$ |
| RSTD_10452 | $4096 <$ RSTD $\le 4101$ | $T_s$ |
| RSTD_10453 | $4101 <$ RSTD $\le 4106$ | $T_s$ |
| ... | ... | ... |
| RSTD_12709 | $15381 <$ RSTD $\le 15386$ | $T_s$ |
| RSTD_12710 | $15386 <$ RSTD $\le 15391$ | $T_s$ |
| RSTD_12711 | $15391 <$ RSTD | $T_s$ |

It has been well known that the RSTD quantization error has an impact on the positioning accuracy. In 3GPP LTE specification, the RSTD quantization is done according to a quantization mapping table, which is shown in Table 4. The unit Ts in Table 4 equals to one time sample duration in LTE. The quantization resolution in Table 4 is 1 Ts if RSTD value falls inside [−4096 Ts, 4096 Ts], or 5 Ts otherwise. It can be seen that the Table 4 is a specific instance of Table 1, by assigning $a_0$ and $a_N$ in Table 1 to be negative infinity and positive infinity, respectively. Although the inequality signs are mismatched between two tables ($\le$ vs. $<$, and $\ge$ vs. $>$), this difference between the two tables does not affect the applicability of the claimed method to RSTD quantization reporting.

According to the claimed method, a quantization scaling factor is associated with each value range in Table 4. Note that the scaling factors for the value ranges within [−4096 Ts, 4096 Ts] can be the same; the scaling factors for the value ranges outside of [−4096 Ts, 4096 Ts] can also be the same but can be different from the scaling factors for the value ranges within [−4096 Ts, 4096 Ts]. For example, the scaling factor for the value ranges within [−4096 Ts, 4096 Ts] can be one real number $k^{(1)}$, while the scaling factor for the value ranges outside [−4096 Ts, 4096 Ts] can be another real number $k^{(2)}$, e.g., $k^{(2)}=5 \cdot k^{(1)}$ with $k^{(1)}$ chosen from {2, 4, 8, 10, 12} and etc.

According to the present application, a second mapping table is generated below as a specific instance of Table 3.

TABLE 5

The second mapping table for RSTD quantization

| Second value range index | Second value range |
|---|---|
| 0 | $[0, \Delta)$ |
| 1 | $[\Delta, 2\Delta)$ |
| . | . |
| . | . |
| . | . |
| j | $[j \cdot \Delta, (j+1) \cdot \Delta)$ |
| . | . |
| . | . |
| . | . |
| M − 1 | $[b_M - \Delta, b_M)$ |

In Table 5, $\Delta=b_M/M$ and $b_M \ge \max(k^{(1)}, 5k^{(2)})$. The mobile station can perform the quantization with scaling based on this second mapping table in the steps as described earlier in this application.

According to the present application, the mobile station can perform the quantization with scaling based on floating-to-integer conversion in steps as described earlier in this application.

Application to Rx-Tx Timing Difference Quantization in ECID Positioning

In the 3GPP Long Term Evolution (LTE) standardization, the enhanced cell-ID (ECID) based solution is specified to support mobile positioning. In ECID, the position of a mobile station is roughly known by the network according to the location of the base station that serves the mobile station. Beyond that, the location of the mobile station can be further refined based on the estimated distance between the mobile station and the serving base station, which can be derived according to the round-trip propagation time between the mobile station and the serving base station. In order to obtain the round-trip propagation time, the serving base station firstly transmits a downlink signal that is received by the mobile station. Upon receiving the downlink signal, the mobile station transmits an uplink signal and reports to the base station the time difference between the time instance of receiving the downlink signal and the time instance of transmitting the uplink signal, i.e., Rx-Tx time difference. Once receiving the uplink signal, the base station measures the time difference between the time instance of transmitting the downlink signal and time instance of receiving the uplink signal, i.e., Tx-Rx time difference. The round-trip propagation time is calculated by the base station or the network server as the difference between Tx-Rx time difference measured by the serving base station and Rx-Tx time difference reported by the mobile station.

TABLE 6

Rx-Tx time difference quantization mapping in LTE

| Reported value | Measured quantity value | Unit |
|---|---|---|
| RX-TX_TIME_DIFFERENCE_0000 | $T_{UE\ Rx-Tx} < 2$ | $T_s$ |
| RX-TX_TIME_DIFFERENCE_0001 | $2 \le T_{UE\ Rx-Tx} < 4$ | $T_s$ |
| RX-TX_TIME_DIFFERENCE_0002 | $4 \le T_{UE\ Rx-Tx} < 6$ | $T_s$ |
| ... | ... | ... |
| RX-TX_TIME_DIFFERENCE_2046 | $4092 \le T_{UE\ Rx-Tx} < 4094$ | $T_s$ |
| RX-TX_TIME_DIFFERENCE_2047 | $4094 \le T_{UE\ Rx-Tx} < 4096$ | $T_s$ |
| RX-TX_TIME_DIFFERENCE_2048 | $4096 \le T_{UE\ Rx-Tx} < 4104$ | $T_s$ |
| RX-TX_TIME_DIFFERENCE_2049 | $4104 \le T_{UE\ Rx-Tx} < 4112$ | $T_s$ |
| ... | ... | ... |
| RX-TX_TIME_DIFFERENCE_4093 | $20456 \le T_{UE\ Rx-Tx} < 20464$ | $T_s$ |
| RX-TX_TIME_DIFFERENCE_4094 | $20464 \le T_{UE\ Rx-Tx} < 20472$ | $T_s$ |
| RX-TX_TIME_DIFFERENCE_4095 | $20472 \le T_{UE\ Rx-Tx}$ | $T_s$ |

In the report of Rx-Tx time difference, the mobile station quantizes the Rx-Tx time difference according to the mapping table in Table 6. The unit Ts in Table 6 equals to one time sample duration in LTE. The quantization resolution in Table 6 is 2 Ts if Rx-Tx time difference falls inside [0 Ts, 4096 Ts], or 8 Ts otherwise. It can be seen that the Table 6 is a specific instance of Table 1, by assigning $a_0$ and $a_N$ in Table 1 to be 0 and positive infinity, respectively. Therefore, the claimed methods of quantization with scaling factor based on a second mapping table or based on a floating-to-integer converter can be applied in the steps as described earlier in this application.

In implementation, the above described methods and their variations may be implemented as computer software instructions or firmware instructions. Such instructions may be stored in an article with one or more machine-readable storage devices connected to one or more computers or integrated circuits or digital processors such as digital signal processors and microprocessors. In a communication system of 3GPP LTE, the claimed method and related operation flow and process may be implemented in form of software instructions or firmware instructions for execution by a processor in the transmitter and receiver or the transmission and reception controller. In operation, the instructions are executed by one or more processors to cause the transmitter and receiver or the transmission and reception controller to perform the described functions and operations.

What is claimed is:

1. A method for transmission of a quantized information value from a transmitter to a receiver by applying a quantization scaling with a scaling factor in one of multiple value ranges, wherein:
   both the transmitter and the receiver share the same segmentation of a quantization range into a number of contiguous value ranges, where each value range is associated with a value range index and a scaling factor;
   on the transmitter side, the transmitter:
      determines a first value range which the information value to be quantized falls into;
      identifies a first value range index and a scaling factor that are both associated with the determined first value range;
      scales a difference between the information value to be quantized and a lowest value in the identified first value range with the identified scaling factor to obtain a scaled difference;
      translates, based on a second value range that is different from the identified first value range, the scaled difference into a mapped integer; and
      transmits both the first value range index and the mapped integer to the receiver; and
   on the receiver side, the receiver:
      receives both the first value range index and the mapped integer from the transmitter;
      identifies the first value range and the associated scaling factor according to the received first value range index;
      selects a value based on the received mapped integer; and
      recovers the quantized value as a summation of the selected value de-scaled by the identified scaling factor and the lowest value in the identified first value range.

2. The method in claim 1, where the translation of the scaled difference into a mapped integer is based on a second mapping table, with the mapped integer to be a second value range index that is associated with the second value range of the second mapping table which the scaled difference falls into.

3. The method in claim 2, where the selection of a value based on the received mapped integer comprising:
   identifying the second value range whose value range index in the second mapping table equals to the received mapped integer; and
   selecting a value within the identified second value range in the second mapping table.

4. The method in claim 1, where the translation of the scaled difference into a mapped integer is based on a floating-to-integer conversion.

5. The method in claim 1, where the quantization factor is stored at the transmitter.

6. The method in claim 1, where the quantization factor is stored at the receiver.

7. The method in claim 1, where the transmitter is a mobile station, and the receiver is a network server.

8. The method in claim 7, where the information value to be quantized is a measured reference signal time difference (RSTD) in observed time difference of arrival (OTDOA) positioning.

9. The method in claim 7, where the information value to be quantized is a measured Rx-Tx time difference in enhanced cell-ID (ECID) positioning.

10. The method in claim 1, where the transmitter is a network server, and the receiver is a mobile station.

11. An apparatus for transmission of a quantized information value, comprising:
    a processor; and
    a memory including instructions stored thereupon, the instructions upon execution by the processor causing the processor to implement a method comprising a quantization scaling with a scaling factor in one of multiple value ranges, each of the multiple value ranges being associated with a value range index and a scaling factor, the method further comprising:
       determining a first value range which the information value to be quantized falls into;
       identifying a first value range index and a scaling factor that are both associated with the determined first value range;
       scaling a difference between the information value to be quantized and a lowest value in the identified first value range with the identified scaling factor to obtain a scaled difference;
       translating, based on a second value range that is different from the identified first value range, the scaled difference into a mapped integer; and
       transmitting both the first value range index and the mapped integer.

12. The apparatus of claim 11, wherein translating the scaled difference into a mapped integer is based on a second mapping table, wherein the mapped integer is a second value range index that is associated with the second value range of the second mapping table which the scaled difference falls into.

13. The apparatus of claim 11, wherein translating the scaled difference into a mapped integer is based on a floating-to-integer conversion.

14. The apparatus of claim 11, where the apparatus is a mobile station.

15. The apparatus in claim 14, where the information value to be quantized is a measured reference signal time difference (RSTD) in observed time difference of arrival (OTDOA) positioning or a measured Rx-Tx time difference in enhanced cell-ID (ECID) positioning.

16. An apparatus for reception of a quantized information value, comprising:

a processor; and a memory including instructions stored thereupon, the instructions upon execution by the processor causing the processor to implement a method comprising a quantization scaling with a scaling factor in one of multiple value ranges, each of the multiple value ranges being associated with a value range index and a scaling factor, the method further comprising:

receiving both a first value range index and a mapped integer;

identifying the first value range and an associated scaling factor according to the received first value range index;

selecting, based on a second value range that is different from the identified first value range, a value based on the received mapped integer; and recovering a quantized value as a summation of the selected value de-scaled by the identified scaling factor and a lowest value in the identified first value range.

17. The apparatus in claim 16, where selecting the value based on the received mapped integer is further based on a second mapping table, wherein the mapped integer is a second value range index that is associated with the second value range of the second mapping table which the scaled difference falls into.

18. The apparatus in claim 17, where selecting the value based on the received mapped integer comprises:

identifying the second value range whose value range index in the second mapping table equals to the received mapped integer; and selecting a value within the identified second value range in the second mapping table.

19. The apparatus of claim 16, wherein the receiver is a network server, and wherein the information value to be quantized is a measured reference signal time difference (RSTD) in observed time difference of arrival (OTDOA) positioning or a measured Rx-Tx time difference in enhanced cell-ID (ECID) positioning.

* * * * *